No. 795,242. PATENTED JULY 18, 1905.
H. J. WEISS.
THREADLESS NUT AND BOLT.
APPLICATION FILED AUG. 26, 1904.
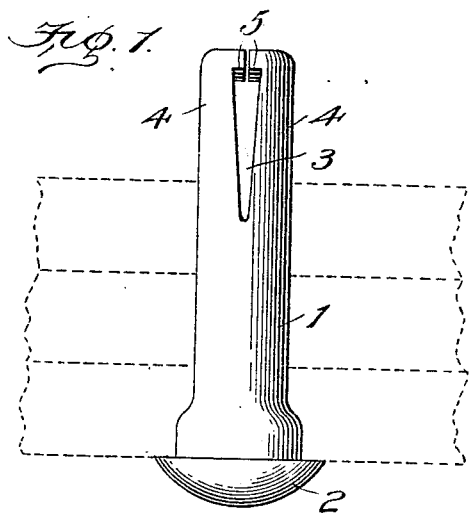
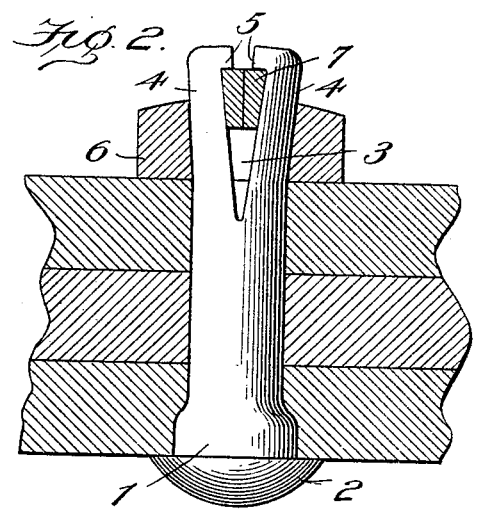
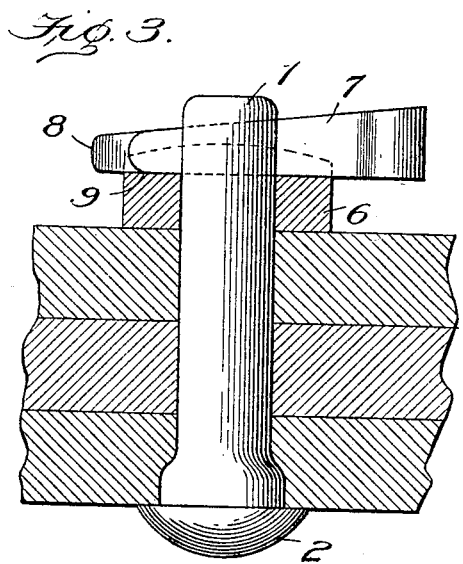
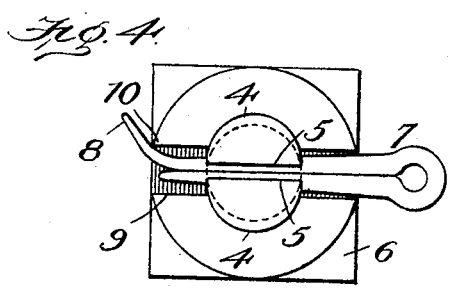
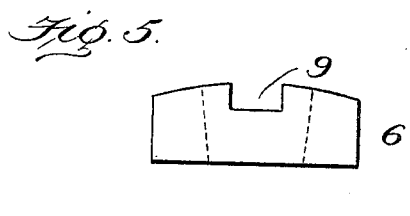
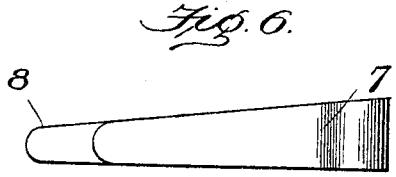
Witnesses
Edwin L. Bradford
Nomie Welsh
Inventor
Henry J. Weiss
By
Richd. Johnston Jr.
Attorney No. 795,242.

Patented July 18, 1905.

UNITED STATES PATENT OFFICE.

HENRY J. WEISS, OF BIRMINGHAM, ALABAMA.

THREADLESS NUT AND BOLT.

SPECIFICATION forming part of Letters Patent No. 795,242, dated July 18, 1905.

Application filed August 26, 1904. Serial No. 222,282.

*To all whom it may concern:*

Be it known that I, HENRY J. WEISS, a citizen of the United States, residing at Birmingham, in the county of Jefferson and State of Alabama, have invented new and useful Improvements in Threadless Nuts and Bolts, of which the following is a specification.

My invention relates to improvements in nuts and bolts, particularly though not exclusively designed for use in connection with railway-joints.

It is the object of my invention to dispense with the usual threaded nut and bolt by providing as an improvement thereon a bolt having a split end each section of which has an internal shoulder. The nut has a flaring central opening through which the end of the bolt is passed, after which a locking-wedge is inserted between the split ends of the bolt, being so constructed that as it is driven in it not only spreads the bolt so as to prevent the disengagement of the nut therefrom, but also acts as a wedge between the shouldered end of the bolt and the nut to force the latter more tightly against the fish-plate. The wedge is preferably formed of an integral metal strip thickest near its central portion, from which it tapers both in thickness and width to each end. This strip is doubled on itself, leaving its ends slightly sprung apart and one projecting beyond the other. This spring character of the wedge makes it less sensitive to jarring and jolting; but to secure it against displacement I preferably provide a channel across the top of the nut, in which the wedge seats and around an outer edge of which the projecting end of the wedge is bent or turned. In this manner I provide a simple and secure means for both locking and tightening the nut on the bolt, for it is only necessary to drive the wedge farther in between the nut and bolt and give its locking end a stroke with a hammer or tool to lock it in its new position, when the nut will have been tightened.

By reference to the accompanying drawings the details of construction of my present invention will be found illustrated in their preferred form.

In the drawings, Figure 1 is a side elevation of the bolt. Fig. 2 is a similar view showing the nut and bolt assembled and locked in position by the wedge. Fig. 3 is a side view of Fig. 2. Fig. 4 is a top plan view of Fig. 2. Fig. 5 is a detail view of the nut. Figs. 6 and 7 are side and top views of the locking-wedge.

Similar reference-numerals refer to similar parts throughout the drawings.

The bolt 1, which is without screw-threads, has the usual head 2 and is provided at its other end with a transverse slot 3. This slot, which may be formed by stamping, casting, or in any desired manner, splits the end of the bolt, leaving two undercut sections 4, which have shoulders 5 that normally abut and overhang the slot, being squared off on their under sides. The slot preferably tapers from the shoulders 5 to the point of convergence of the end sections.

The nut 6, which may be of any desired external construction, has a smooth internal bore which tapers or flares slightly, and preferably in an oval shape, from the base of the nut, where it is smallest. After the bolt has been passed through the fish-plates or other bodies to be united this nut is slipped over its split end. To secure the nut on the bolt and lock it securely against displacement, I provide the locking and tightening key 7, formed of a strip of metal bent on itself and tapering from the bend both in longitudinal thickness and width, as will be seen more clearly in Figs. 6 and 7. To make a closer fit in the slot, the key may also be slightly wedge-shaped in cross-section; but this is not essential. The side parts of the key are sprung slightly apart normally, and one end 8 projects beyond the other end. This key is inserted into slot 3, its edge toward the nut resting in a transverse channel or groove 9 across the top of the latter, while its upper edge engages the overhanging shoulders 5. As it is forced in its increasing thickness will spread the end sections 4 apart until they fill out the flaring bore of the nut to take all shearing strain off the key and cause it to be assumed by the bolt itself. At the same time it will be wedging between the shoulders 5 and the nut, forcing the latter against the fish-plate. When the nut is sufficiently tight, the end 8 of the key will be bent around the edge 10 of the groove 9 in the nut to prevent the key jarring out of place and unlocking the nut. Any suitable instrument may be used to bend the end 8, preferably such a one as may also be used to straighten out the end 8, so that the key may be knocked out when it is desired to remove the nut.

To tighten the nut, it is only necessary to drive the key in farther and then bend end 8 again or force it around edge 10 until it serves to lock the key in this latter position.

The groove in the nut is not essential to my device, as the key could be bent around the bolt, if desired, and other modifications may be made in the details of construction without departing from the spirit of my invention.

Having thus described my invention, what I claim as new, and desire to protect by Letters Patent, is—

1. In a device of the character described, an unthreaded bolt having a divided end provided with an overhanging part, an unthreaded nut adapted to fit over said end, and a key adapted to be inserted between the sections of the divided bolt end to spread the same and having a tapering portion disposed between the nut and the overhanging part of the bolt for tightening the former, substantially as described.

2. In a device of the character described, the combination of an unthreaded bolt, a transverse slot through an end thereof forming two undercut end portions, a nut having a tapering bore, and a tapering key, wedge-shaped in the direction of its length, for spreading the slotted end of said bolt and tightening said nut.

3. In a device of the character described, the combination of an unthreaded nut, a split bolt, a key tapering in longitudinal width and thickness which is adapted to be inserted transversely between the split ends of said bolt, and a portion of said bolt, between which and said nut the said key is interposed, and adapted, by engaging said portion, to act as an adjustable tightener for said nut.

4. In a device of the character described, an unthreaded bolt split at one end and transversely slotted, a nut adapted to slip over said split end of the bolt, and means to lock and tighten said nut on the bolt comprising a key tapering in longitudinal width and thickness, adapted to spread the bolt and tighten the nut by being forced into said slot.

5. In a device of the character described, an unthreaded bolt split at one end by a transverse slot, a nut transversely grooved on its outer face, a split key, tapering in longitudinal thickness which, when inserted in said slot in the bolt, spreads the split ends thereof and rests in the groove in the nut, said key having a flexible end adapted to lock it in place by being bent around an edge of said groove in the nut.

6. In a device of the character described, the combination of a bolt formed without threads and having an undercut shoulder at or near one end, an unthreaded nut to be slipped over said end and provided with a transverse groove in one of its faces, and a wedge-key tapering in longitudinal width and adapted to be interposed between said shoulder and nut, and to have its tapering portion forced against said shoulder to tighten said nut, said key having a flexible end adapted to lock it in place by being bent around an edge of the groove in said nut.

In testimony whereof I have hereunto set my hand in presence of two subscribing witnesses.

HENRY J. WEISS.

Witnesses:
R. D. JOHNSTON,
H. M. HORTON.